United States Patent [19]

Schmidt et al.

[11] Patent Number: 5,346,170
[45] Date of Patent: Sep. 13, 1994

[54] METHOD AND APPARATUS FOR ADJUSTING AND MAINTAINING THE HEIGHT OF A SPRING-ACTION PASSENGER SEAT

[75] Inventors: Klaus Schmidt, Roth; Werner Stecher, Abenberg, both of Fed. Rep. of Germany

[73] Assignee: Siemens Aktiengesellschaft, Munich, Fed. Rep. of Germany

[21] Appl. No.: 976,244

[22] Filed: Nov. 13, 1992

[30] Foreign Application Priority Data

Nov. 14, 1991 [DE] Fed. Rep. of Germany ....... 4137509

[51] Int. Cl.$^5$ ............................................. F16M 13/00
[52] U.S. Cl. ................................... 248/550; 248/421; 248/588
[58] Field of Search ............... 248/550, 588, 631, 421; 297/338, 339, 345, 347, DIG. 8

[56] References Cited

U.S. PATENT DOCUMENTS

| | | | |
|---|---|---|---|
| 4,198,025 | 4/1980 | Lowe et al. | 248/588 X |
| 4,397,440 | 8/1983 | Hall et al. | 248/550 |
| 4,461,444 | 7/1984 | Grassl et al. | 248/550 |
| 4,589,620 | 5/1986 | Sakamoto | 248/550 |
| 4,638,982 | 1/1987 | Misher et al. | 248/550 X |
| 4,709,896 | 12/1987 | Wahls | 248/550 |
| 4,733,847 | 3/1988 | Grassl | 248/550 |
| 5,058,852 | 10/1991 | Meier et al. | 248/588 |
| 5,169,112 | 12/1992 | Boyles et al. | 248/550 |
| 5,169,113 | 12/1992 | Brodersen | 248/631 |

FOREIGN PATENT DOCUMENTS

| | | |
|---|---|---|
| 2736242 | 11/1980 | Fed. Rep. of Germany . |
| 3930612 | 3/1991 | Fed. Rep. of Germany . |
| 1601370 | 10/1981 | United Kingdom . |

*Primary Examiner*—Karen J. Chotkowski
*Attorney, Agent, or Firm*—Kenyon & Kenyon

[57] ABSTRACT

The value of the absolute seat height may be formed from the sum of a first, stationary basic component and a second, quasi-stationary regulation component. The value of the regulation component may be adjusted, independent of the weight of a person resting on the seat, in such a way that it takes on the value of a reference value that corresponds to the height of a person resting on the seat, at least on the average over time. Preferably, a regulation mechanism activates the height adjustment device in steps, in the form of activation steps. Preferably, the activation periods are furthermore increased or decreased by a time component, if the previous activation step caused an overly small or overly large lift.

20 Claims, 6 Drawing Sheets

METHOD AND APPARATUS FOR ADJUSTING AND MAINTAINING THE HEIGHT OF A SPRING-ACTION PASSENGER SEAT

BACKGROUND OF THE INVENTION

The invention relates to a method and an apparatus for adjusting and maintaining the absolute seating surface height of a spring-action passenger seat, independent of interference factors, particularly in a motor vehicle.

Spring-action passenger seats, which rest or are installed on a non-fixed base, are affected by a plurality of external interference factors. This is particularly true, for example, for driver's seats in trucks, buses, construction equipment, rail vehicles and many others. Here, the seating surface height as set by the driver in accordance with his individual height is supposed to be maintained, on an average over time, in spite of external influences and the temporary effect of the spring action of the seat.

In this connection, there is the problem, for one thing, that persons with approximately the same height can have different weights. A heavy person will therefore "sink into" the seat to a greater degree, even in the stationary case, i.e. will put greater stress on the seat springs, than a person of the same height with less weight. Therefore one task consists of ensuring that the seating surface height, which is essentially dependent on the person's height, is maintained, at least independent of the weight of the person resting on the seat.

In practical situations, however, a plurality of other, particularly dynamic interference factors acts on a seat which has means to adjust the seat height and seat springs, and these influence the seating surface height that really comes about. The surface on which a seat is placed in a truck, for example, is subject to horizontal shocks of varying amplitude and frequency, which may be caused by unevenness of the road surface and vibrations caused by the motor, and which can also be dependent on the load of the motor vehicle. Such influences provoke at least temporary, in some circumstances even permanent deviations of the seating surface height from the value that has been set as optimal for the person's height.

Other influence factors which occur are wear, the lubrication condition and the level of dirtiness of the seat mechanism. Thus, the mechanism can become more difficult to move after longer use. The lift of the seat springs in leveling out road bumps, for example, becomes less, and greater internal friction and adhesion forces cause an earlier delayed response of the seat springs. In case of great wear, the reverse can also occur, namely that the mechanism loses its internal tension and demonstrates significant play. In this case, too, increasing permanent deviations from the desired seating surface height can occur with extended use of a seat.

Finally, climatic influences, particularly humidity and ambient temperature, also affect the functioning of the seat mechanism. For example, during the winter, when a motor vehicle is cold-started, the case can occur that the seat mechanism is temporarily stiff, but the seating surface height slowly drops with an increased warming of the motor vehicle interior, e.g. due to sun radiation, and takes a lower stationary level. In spite of the fact that the seating surface height was originally set at the optimum for the person's height, a permanent change in the seating surface height occurs over time, during operation. Finally, changing humidity conditions, for example in case of rain or snow, can also have an effect on the proper functioning of the seat mechanism.

From DE 27 36 242 A1, DE 33 12 732 A1 and U.S. Pat. No. 4,589,620, spring-action passenger seats are already known, in which a predetermined reference position of the seat is maintained, independent of the weight of the person resting on them. The known embodiments are based on the common principle that at least two comparator-like detector elements which are fixed in place, arranged one above the other, are present, and detect impermissibly high deviations of the seating surface height from the reference position. When a binary response signal of the upper or lower detector element occurs, the seat is lowered or raised, respectively. The method of functioning of the known embodiment therefore essentially corresponds to that of a two-point regulator. These arrangements have the disadvantage that the distance between the two limit switches, which lie one above the other, has to be selected relatively large. However, this impairs the ability of the seat springs to absorb shocks, for one thing. For another, the predetermined reference position can only be achieved with a relatively great inaccuracy, which depends on the distance between the limit switches that lie one above the other.

SUMMARY OF THE INVENTION

In contrast to this, the present invention is a method and an apparatus which can be used to set a predetermined reference value for the absolute seating surface height with very great accuracy, and to maintain it without impairing the ability of the seat to use spring action to absorb shocks.

According to the invention, the value of the absolute seating surface height is formed from the sum of a first, stationary basic component and a second, quasi-stationary regulation component. The regulation component is adjusted, independent of the weight of a person resting on the seat, in such a way that it approaches a reference value that is dependent upon the height of the person resting on the seat, on the average over time.

DETAILED DESCRIPTION

Figure 1:
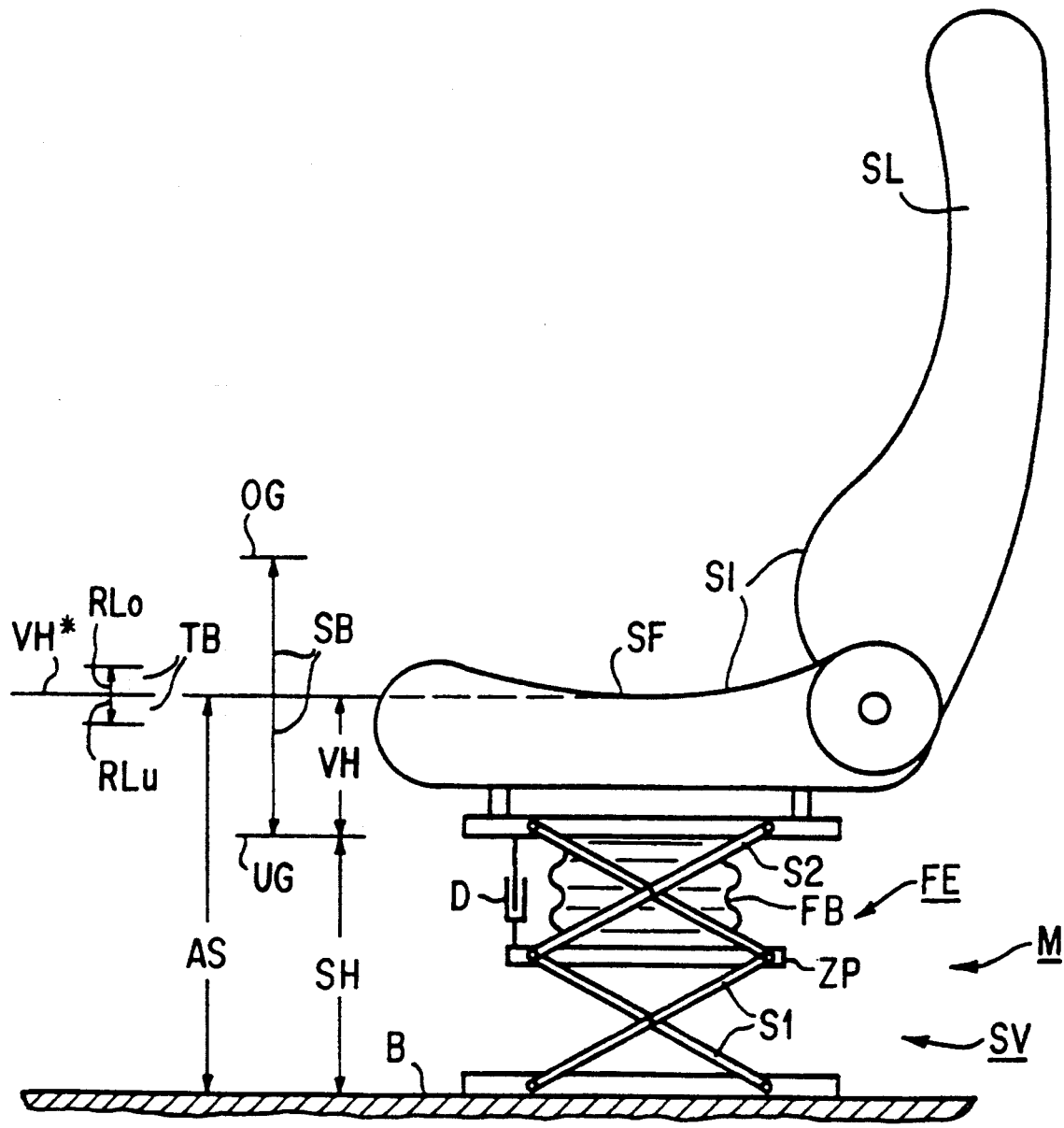
FIG. 1 is a side view of a passenger seat with separate means, according to the present invention, to make the stationary basic component and the quasi-stationary regulation component of the absolute seating surface height available.

FIG. 1 shows a side view of a passenger seat SI consisting of the seat back SL and the seating surface SF. According to the present invention, the value of the absolute seating surface height AS, with reference to a base surface B, is composed of two components. The first, stationary basic component SH has a fixed value that is independent of external influence factors. In contrast, the second, quasi-stationary regulation component VH can temporarily carry out dampened oscillations, due to excitation of the seat springs by external influence factors. The value of the quasi-stationary regulation component VH can carry out oscillations dampened in an oscillation range SB, having an upper limit OG and a lower limit UG, around a reference value VH*. It is desirable that in the stationary case and on the average over time, the value of the second, quasi-stationary regulation component VH approaches the value of the reference value VH* which lies in the oscillation range SB, independent of the weight of the person resting on the seat in each instance. The reference value therefore represents a position that is to be achieved in both the stressed and the unstressed condition of the seat, on the average over time.

According to the present invention, the value of the second, quasi-stationary regulation component VH is continuously detected as a measurement value, and a time average value VHm is formed from this. According to the invention, the quasi-stationary regulation component is then adjusted in such a way that its time average value VHm approaches the value of the reference value VH*.

The continuous measurement of the second, quasi-stationary regulation component VH, the subsequent time average value VHm formation and the subsequent adjustment of the time average value VHm of the regulation component VH have the advantage that the functions "seat spring action" and "adjustment of the regulation component to the reference value" are uncoupled from each other. Since uniform oscillations of the seat springs hardly change the value of the time average value VHm, the activity of the seat springs is not hindered, in a normal case, by measures to adjust the quasi-stationary regulation component VH. An adjustment is only triggered if the time average value VHm of the quasi-stationary regulation component VH constantly deviates from the reference value VH*. Due to the uncoupling of the functions "seat spring action" and "adjustment of the regulation component to the reference value," the tolerance band around the reference value, within which the value of the time average is to stay, can be very small. The average of the regulation component VHm can therefore be very precisely adjusted to the reference value VH*.

The division of the absolute seating surface height into the basic component and the regulation component according to the invention, and the adjustment of the regulation component according to the invention have the advantage that a predetermined reference value, particularly one dependent on the height of the person resting on the seat is maintained as the absolute seating surface height, independent of the influence of external interference factors. In particular, the value of the quasi-stationary regulation component VH approaches the reference value, on the average over time, independent of the weight of the person resting on the seat in each instance. Other interference factors, which cause a constant deviation of the value of the quasi-stationary regulation component from the reference value, are also compensated in a particularly advantageous manner. Thus, any interference factors caused by the seat mechanism itself, and brought about by wear, internal friction and the like, can particularly be compensated in such a way that the regulation behavior of the adjustable, spring-action passenger seat remains constant over a long period of time.

Pursuant to a particularly advantageous further embodiment of the method according to the invention, an unchanging, fixed value is assigned to the reference value VH* for the second, quasi-stationary regulation component VH of the absolute seating surface height AS. Preferably, this lies approximately in the middle of the oscillation range SB of the seat springs or slightly above this center position. The optimal adjustment of a desired absolute seating surface height AS, dependent on the person's height, is then accomplished by adjustment of the first, stationary basic component SH. Such an embodiment has the advantage that the functions "adjustment of the regulation component to the reference value" and "seat spring action" are uncoupled from one another. Thus the second, quasi-stationary regulation component VH is adjusted to the reference value VH*, independent of the stress when dampened oscillations of the seat occur. Approximately the same maximum positive and negative stroke of the spring action of the seat is therefore constantly available within the upper limit OG and the lower limit UG.

FIG. 1 shows an apparatus structured according to the invention to adjust and maintain the absolute seating surface height AS of a spring-action passenger seat, independent of influence factors. It has mechanism SV to adjust the first, stationary component SH, and further means FE to detect and adjust the second, quasi-stationary regulation component VH of the absolute seating surface height AS. In the example of FIG. 1, the seat mechanism M has a preferably power-driven first sliding lattice gate S1 as the mechanism SV to adjust the stationary basic component. With this, an intermediate plate ZP can be positioned at a fixed distance relative to a base and set-up surface B.

On this intermediate plate ZP, the means FE to detect and adjust the quasi-stationary regulation component VH and the passenger seat SI itself are attached. According to the invention, these means have additional spring-action height adjustment means FE' to adjust the quasi-stationary regulation component VH, which permit dampened oscillations of the seat around the reference value VH* for the regulation component VH. In the example of FIG. 1, a folded bellows FB driven by compressed air serves as such means FE'. The use of such a pneumatic spring as a spring-action height adjustment means FE' has the additional advantage that according to the invention, the regulation mechanism, as depicted in FIGS. 2 to 6, can engage with it in such a manner that the value of the regulation component VH of the absolute seating surface height AS takes on the value of a reference value VH* both in the stationary case and on the average over time. The folded bellows FB thus serves also as a lifting means FB' for adjustment of the quasi-stationary regulation component VH. In the example of FIG. 1, finally, a second sliding lattice gate S2, connected with the intermediate plate ZP, is present for lateral guidance of the passenger seat SI resting on the folded bellows FB. For further dampening of oscillations of the spring/mass system which essentially consists of the seat SI, a person resting on it, and the laterally guided folded bellows FB, an additional damper D can be provided.

With reference to FIGS. 2 to 6, an example of a program representing the regulation mechanism according to the invention, to influence the second, quasi-stationary regulation component VH of the absolute seating surface height AS, will be explained in greater detail in the following.

Figure 2:
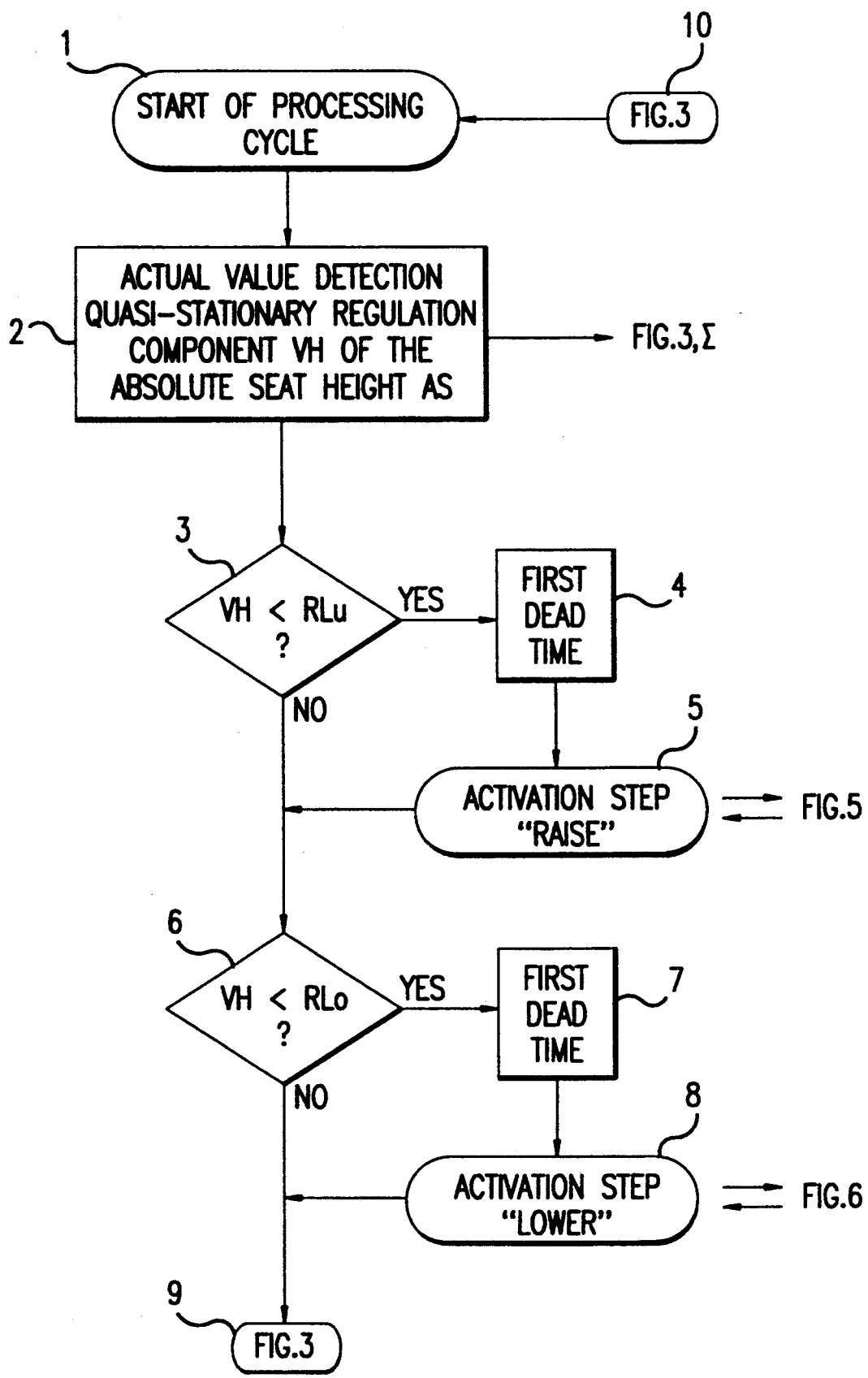
FIG. 2 is a first part of a program representing the regulation mechanism according to the invention for influencing the quasi-stationary regulation component, which relates to value detection and suppression of setting interventions in the case of short-term oscillations of the seat.
Figure 3:
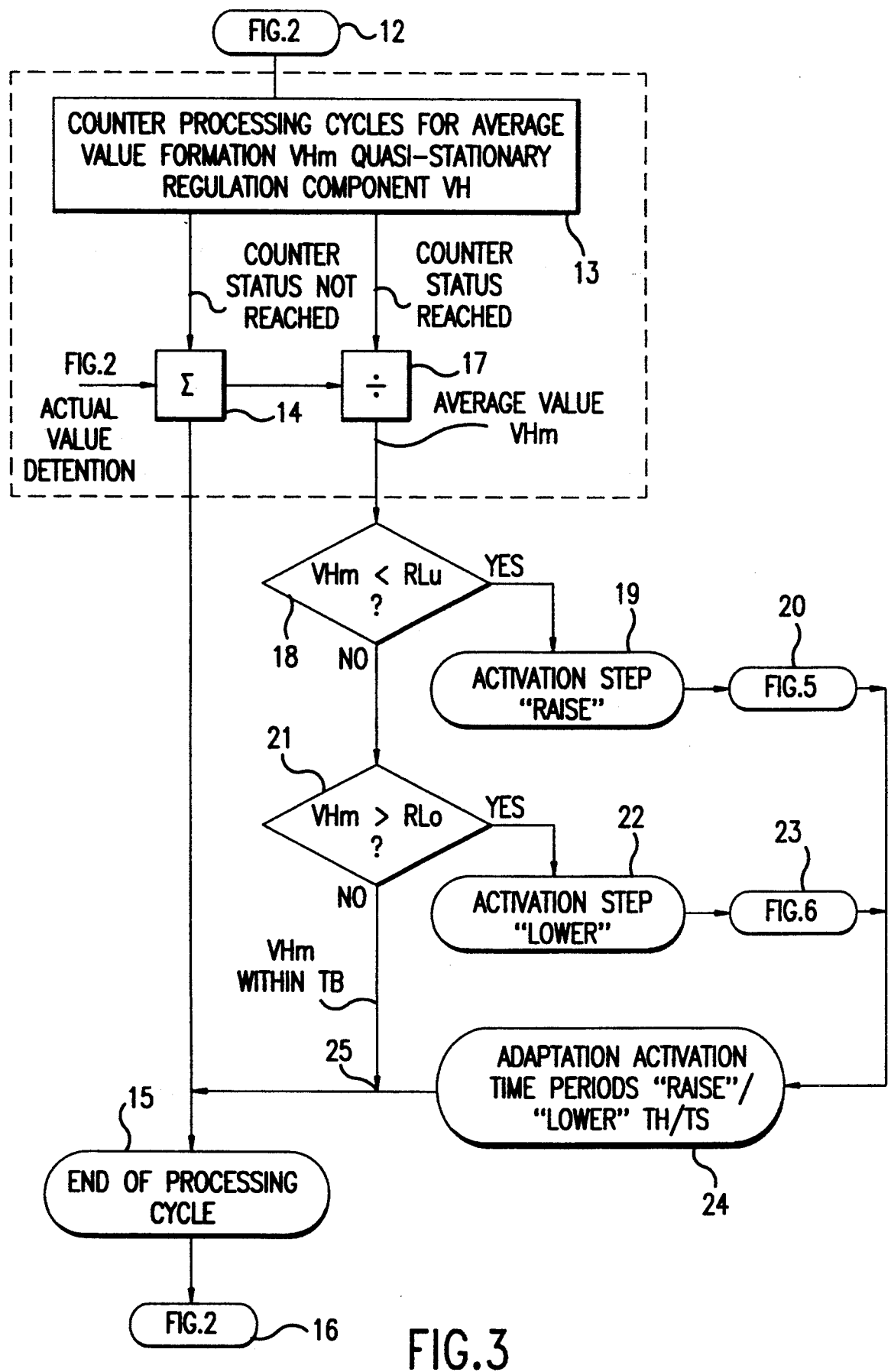
FIG. 3 is a second part of the program as a continuation of FIG. 2, which relates to the average value formation of the quasi-stationary regulation component and the step-by-step activation of the spring-action height adjustment means, with variable activation periods.

The processing program, which is run cyclically in short time intervals, e.g. every 10 to 20 milliseconds, is shown in block schematic form in FIGS. 2 and 3. The processing cycle starts with the program call-up 1. A value detection 2 follows, which scans the current value of the quasi-stationary regulation component VH of the absolute seat height AS. With the subsequent query steps 3 and 6, it is determined whether the value of VH detected during value detection 2 lies within a tolerance range TB around the reference value VH* and represented in FIG. 1. Thus, query steps 3 and 6 check whether VH is smaller or greater than an upper limit RLo or lower limit RLu of the tolerance range TB. If the current value VH lies within the tolerance range, queries 3 and 6 are consequently answered with no, and the regulation mechanism does not have to intervene to activate the spring-action height adjustment means FE'. The program is then continued in FIG. 3. If, on the other hand, queries 3 and 6 signal that the tolerance range limits RLu or RLo have been exceeded, an activation step "raise" or "lower" is triggered, in accordance with program steps 5 or 8, respectively. In the example of FIG. 1, the regulation mechanism causes compressed air to be supplied to the pneumatic folded bellows FB for a predetermined activation period, or causes air to be let out for a predetermined activation period. The program steps necessary for the activation steps "raise" or "lower" are each summarized in a subprogram and represented in FIGS. 5 and 6. Accordingly, the program steps 5 and 8 in FIG. 2 refer to the subprogram in FIGS. 5 and 6 with double arrows.

Pursuant to a further embodiment of the invention, as shown in FIG. 2, the spring-action height adjustment means FE' are not activated, if the detected value of the quasi-stationary regulation component VH of the absolute seating surface height AS exceeds the lower limit RLu or the upper limit RLo of the tolerance range TB for only the duration of a first dead time, i.e. only for a short time. Such deviations can occur, for example, if the person resting on the seat stands up briefly, or briefly leans on the steering wheel of a motor vehicle. In the example of FIG. 2, this dead time is processed in the program steps 4 and 7. As long as the dead time has not yet elapsed, the program cannot be continued with the steps 5 or 8. If, on the other hand, the fact that RLu or RLo is exceeded even after expiration of the first dead time, then VH is directly adjusted to VH* via the activation steps 5 or 8, respectively. Such a case can occur, for example, if the person has stood up from the seat and has left it.

The example of the program representing the invention pursuant to FIGS. 2 and 3, has the advantage that the regulation mechanism activates the spring-action height adjustment means FE' step by step, in the form of individual activation steps. Thus, for example, in case the value VH goes below the lower limit RLu of the tolerance range TB by a greater amount, the program step 5 in FIG. 2 will be run several times. Here, a new activation step "raise" is triggered each time, which has the result of applying feed pressure to the folded bellows FB for a predetermined activation period for the example in FIG. 1. This step-by-step adjustment of the value of VH has the result that the desired reference value VH* is harmonically "approached" by the regulation mechanism. In this way, sudden changes in the seating surface height, which would be unpleasant for the person resting on the seat, are avoided. Instead, the step-by-step activation of the spring-action height adjustment means FE' results in user-friendly behavior when absorbing deviations caused by interference factors.

FIG. 3, in continuation of FIG. 2, shows the second part of the program representing the regulation mechanism according to the invention to influence the spring-action height adjustment means FE'. Here, a continuation element 12, which refers back to FIG. 2, is followed by the program steps 13, 14 and 17, which relate to the formation of a time average VHm of the quasi-stationary regulation component VH. For this, the number of processing steps of the program shown in FIGS. 2 and 3 is first counted and provided in program step 13 for formation of the average. In each program run, the current value of the quasi-stationary regulation component VH is scanned by the value detection 2 and added to the content of a memory cell 14. If the counter status provided for average value formation in program step 13 has not been reached yet, the processing cycle in each instance is ended via the program step 15, and the program returns to the start in FIG. 2 for a new program run. If the counter status provided for average value formation is reached in program step 13 in one of the cyclical program runs, then the average value VHm of the quasi-stationary regulation component VH is formed using a division step 17. For this, the value of the memory cell 14 is divided by the counter status of 13 and subsequently the elements 13 and 14 are reset for a new formation of the average.

The average value VHm can now be subjected to further processing in the program steps 18 to 25. This has the goal, in contrast to the program part of FIG. 2, of balancing out long-term deviations of the quasi-stationary regulation component VH, which express themselves in a gradual "drifting" of the time average value VHm from the predetermined reference value VH*.

Thus, the average value VHm is again monitored in query steps 18 and 21, to check whether it has exceeded the lower limit RLu or the upper limit RLo of the tolerance range TB around the reference value VH*. If the average value VHm lies within the tolerance range, queries 18 and 21 are consequently answered in negative manner, then the processing cycle in each instance is reset to the starting point 1 via the program steps 15 and 16. If, on the other hand, queries 18 and 21 signal that the limits RLo or RLu have been violated, then the activations steps "raise" 19 and 20 or "lower" 22 and 23 are performed, thereby activating the spring-action height adjustment means FE'. Corresponding to the first program part of FIG. 2, these activation steps are implemented by branching 20 and 23 to the subprogram parts of FIGS. 5 and 6. After expiration of the activation step in each instance, the processing cycle is ended via the node point 25 and the elements 15 and 16.

Monitoring of the time average VHm of the quasi-stationary regulation component for violation of the limits RLu and RLo of the tolerance range TB has the advantage that long-term, e.g. wear-related or seasonal, deviations of the quasi-stationary regulation component VH from the predetermined reference value can be compensated on the average over time. Thus it is even possible to at least temporarily balance out slight defects in the seat mechanism, e.g. leakages in the case of a folded bellows FB which serves as a spring-action height adjustment means FE'.

Figure 5:
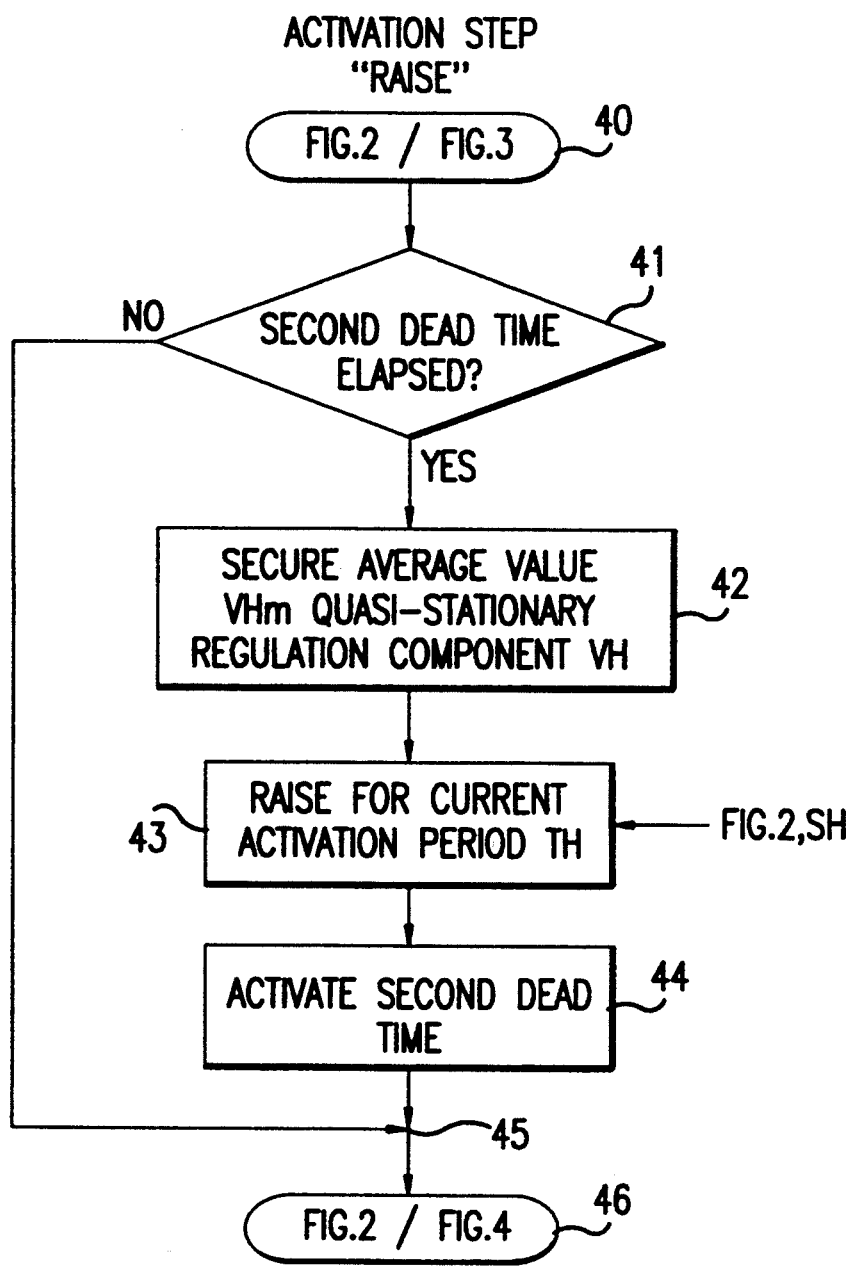
FIG. 5 is another subprogram of the program pursuant to FIGS. 2 and 3, which relates to the step-by-step raising of the spring-action height adjustment means.

FIG. 5 shows an example of the program steps in a subprogram which are needed in an activation step to "raise" the spring-action height adjustment means FE'. Here, the subprogram is activated via a program call-up 40, by the program step 5 in FIG. 2, or 30 in FIG. 3. The activation of the spring-action height adjustment means FE' takes place via the program step 43 for raising, for the duration of a predetermined activation time TH. It is advantageous if the previously valid average VHm of the stationary regulation component VH is secured in a prior program step 42. In a subsequent program step 44, a second dead time is finally activated. This has the result that the program steps 42, 43 and 44 are skipped, using branching 41 at the program start, until the dead time has elapsed.

Activation of the second dead time in the program step 44 immediately after triggering of an activation step in the program step 43 has the result that the subprogram "raise" is blocked for the duration of the second dead time, and only after the dead time has elapsed can a new activation step "raise" with the duration TH be triggered. In this way, transitional processes, which are triggered in the seat mechanism by the previous activation step, can level out, before a new activation step can be triggered. Only after expiration of the second dead time is a value for the quasi-stationary regulation component VH available, so that the positive or negative lift which was achieved by the activation step can be determined. Only then can it be reliably determined whether the preceding activation step was sufficient to bring the value of the quasi-stationary regulation component VH back to the reference value VH*, or whether additional activation steps are still necessary for this.

Figure 6:
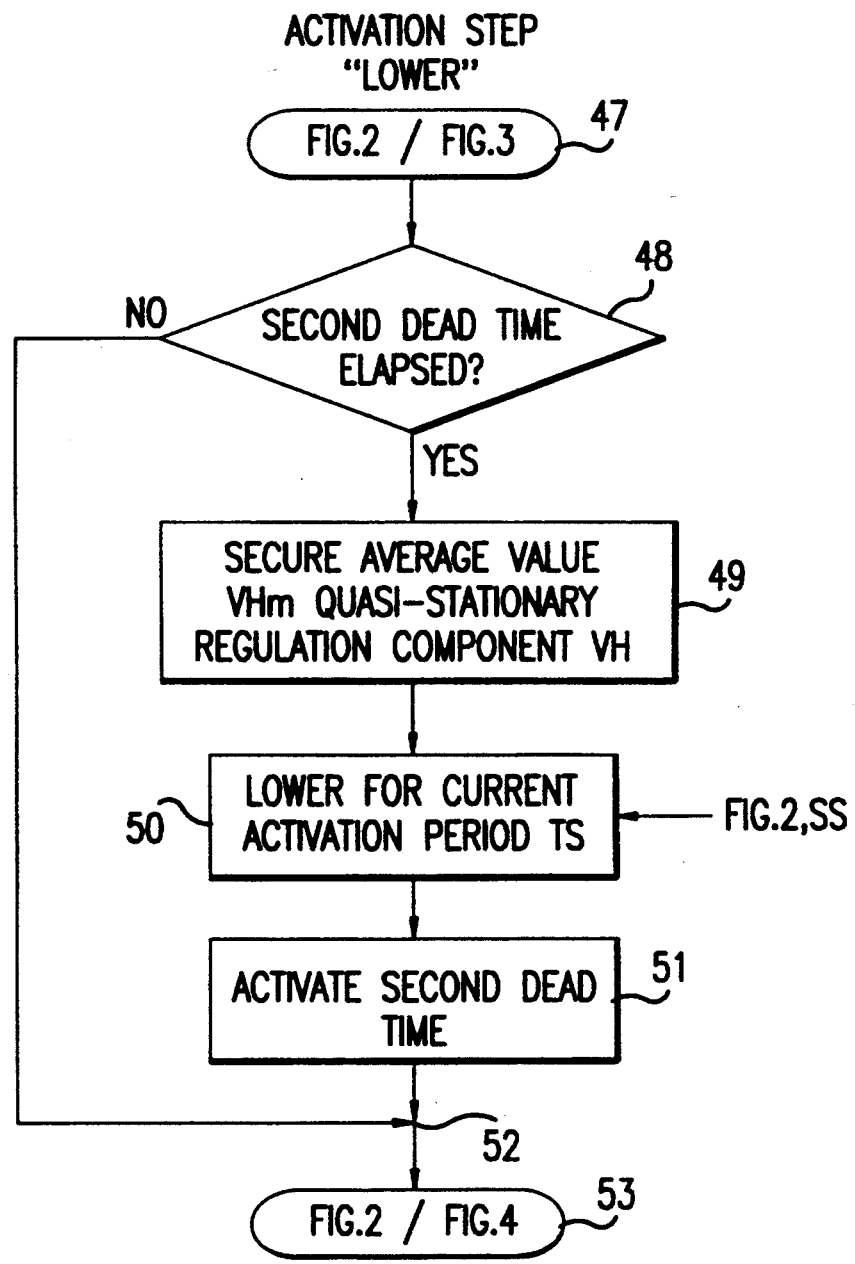
FIG. 6 is another subprogram, which relates to the step-by-step lowering of the spring-action height adjustment means.

FIG. 6 shows a subprogram for an activation step of the regulation mechanism which "lowers" the spring-action height adjustment means FE'. Here, the program steps 47 to 53 essentially correspond to the program steps 40 to 46 explained for FIG. 5. In the essential program step 50, "lowering" of the spring-action height adjustment means FE' is triggered for the duration of a predetermined activation time TS. For the remainder, the subprogram of FIG. 6 completely corresponds to that of FIG. 5, so that reference is made to the explanations for latter for an understanding.

Pursuant to a further embodiment of the invention, the regulation mechanism is structured in such a way that it adapts the periods TH or TS to the individual activation steps "raise" or "lower." Here, according to the invention, the activation period TH and TS in each instance is increased or reduced by a time component per repeat program run, if the positive or negative lift achieved after the preceding activation step has not exceeded a minimum or maximum value. In the flow chart of FIG. 3, such an "adaptation" of the activation periods is indicated for the cases of raising or lowering in the program step 24.

Figure 4:
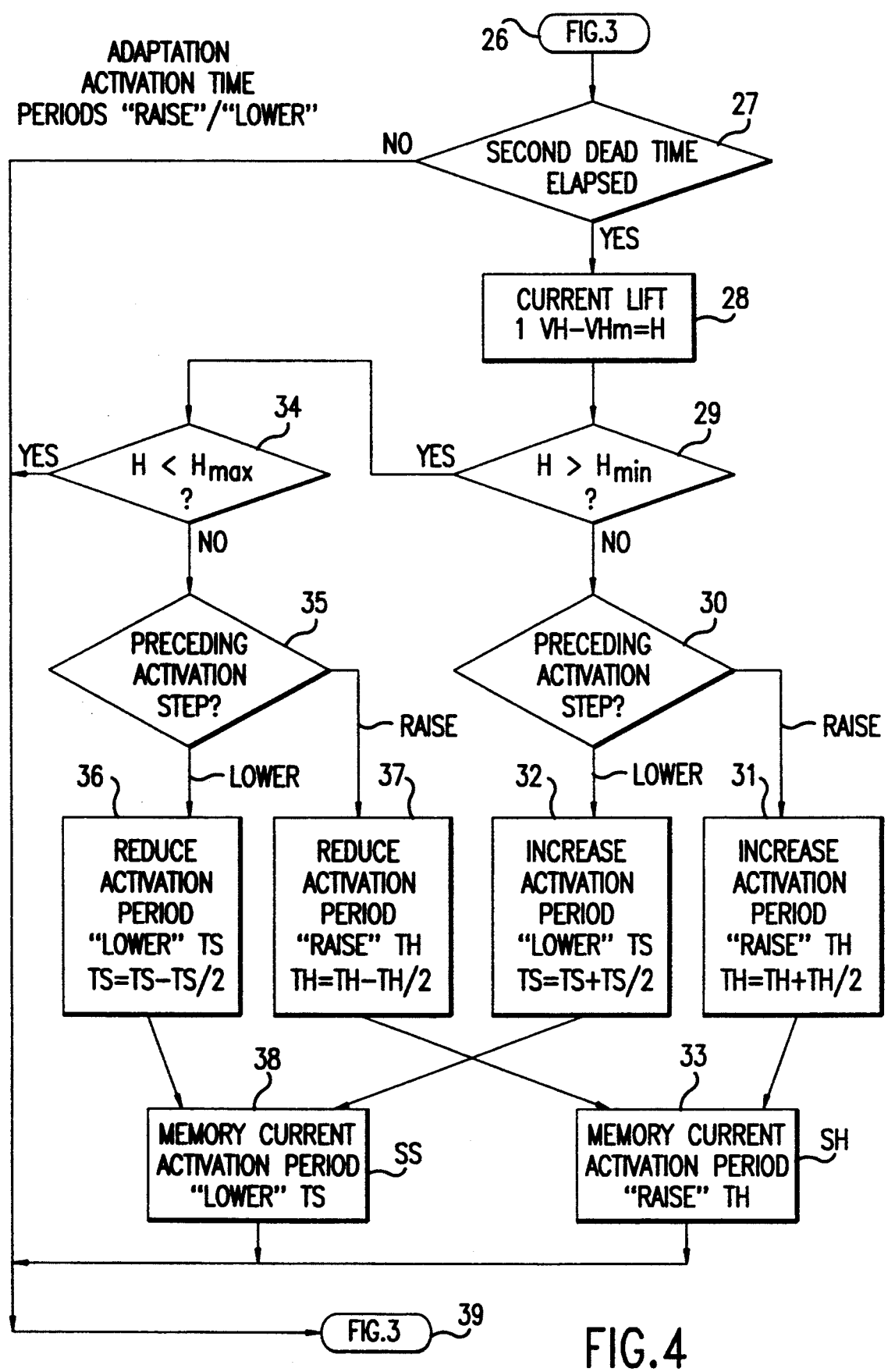
FIG. 4 is a subprogram of the program pursuant to FIGS. 2 and 3, which relates to the change of activation periods for the spring-action height adjustment means.

In the program representing the regulation mechanism according to the invention, this adaptation of the activation periods is carried out in a separate subprogram, which is shown in FIG. 4, and is called up via the program step 24 in FIG. 3 and run subsequent to an activation step "raise" 19 and 20 or "lower" 22 and 23. The program call-up 26 at the beginning shows the reference to FIG. 3. In the subsequent query step 27, a check is carried out to determine whether a second dead time, which was started subsequent to a preceding activation step by means of the program steps 44 in FIG. 5 or 51 in FIG. 6, has already elapsed. If this is not the case, then the subprogram part of FIG. 4 is prematurely ended by jumping to the continuation element 39, in the same manner as in the subprograms of FIGS. 5 and 6.

Entry into the subprogram by query element 27 occurs only after expiration of the second dead time. Then the value of the lift H achieved by the preceding activation step of the spring-action height adjustment means FE' is determined in a program step 28. Its value corresponds to the amount of the difference between the value of the quasi-stationary regulation component VH and the current value of the time average value VHm. In the subsequent query elements 29 and 34, a check is made to determine this lift H has exceeded a predetermined minimum value Hmin or maximum value Hmax. If both questions are answered in positive manner, then the subprogram is ended prematurely by jumping to the program step 39. The program sequence is then continued in FIG. 3, following the program step 24, in the usual manner.

If, on the other hand, one of the query steps 29 or 34 signals a negative result, then the duration of the activation step in question is adjusted, according to the invention.

If query element 29 signals a negative result in the example of FIG. 4, the lift achieved by the preceding activation step is too small, so that the activation period in each instance is increased using the subsequent program steps 30 to 33. If query step 34 signals a negative result, in corresponding manner, then the lift achieved by the preceding activation steps has an impermissibly great value. Accordingly, the related periods of the activation steps are reduced, using the subsequent program steps 35 to 38.

In case of a necessary increase of the activation periods, it is first determined in query element 30 whether the preceding activation step triggered lowering or raising of the spring-action height adjustment means. In case of a preceding lowering, the activation period "lower" TS is increased in program step 32, while in case of a preceding raising, the activation period "raise" TH is increased in program step 31. It is advantageous if the current values of the activation periods for lowering or raising formed in this way are placed in separate memory elements 38 or 33. Their contents are particularly available for the program steps 43 or 50 in the subprogram parts of FIGS. 5 and 6.

In a corresponding manner, query step 35 checks whether the preceding activation step resulted in lowering or raising of the spring-action height adjustment means FE', if the lift which occurred was too great. In case of a prior lowering, the activation period "lower" TS is increased in program step 36, while in case of a preceding raising, the activation period "raise" TH is reduced in program step 37. Here again, it is advantageous if the current activation periods for lowering or raising formed in this manner are stored in the separate memory elements 38 or 33.

Pursuant to a further embodiment of the invention, already shown in the block schematic of FIG. 4, it is advantageous if the times TH or TS are increased or reduced by half of their previous value per run of the subprogram for adaptation of the activation periods. Thus, in the program steps 31 and 32, the current lowering time TS is decreased by TS/2, or the current lifting time TH is increased by TH/2. In a corresponding manner, the current lowering time TS is reduced by TS/2 and the current lifting time TH is reduced by TH/2 in program steps 36 and 37.

The adaptation of the activation periods according to the invention, preferably by half of the originally present value in each instance, has the advantage that in case of a repeat run of the subprogram of FIG. 4, the activation period in each instance gradually increases or decreases via the same program steps. In this way, particularly harmonious regulation behavior of the spring-action height adjustment means FE' is achieved. Such a progressive soft approach of the spring-action height adjustment means represents a good compromise. A person resting on the seat is exposed only to lifting shocks which gradually become longer or shorter, on the one hand. On the other hand, the value of the quasi-stationary regulation component VH can be adjusted to the value of the reference value VH* within a relatively short regulation time, even if greater deviations occur. The activation periods in each instance are then extended or reduced progressively, according to the invention, as a function of the amount of the number of triggerings. Furthermore, overly long activation periods are gradually adjusted automatically by the regulation mechanism.

What is claimed:

1. A method for adjusting and maintaining the absolute seating surface height of a spring-action passenger seat, independent of interference factors, particularly in a motor vehicle, comprising the steps of:
    a) forming an absolute seating surface height from the total of a first, stationary basic component and a second, quasi-stationary regulation component, wherein said second, quasi-stationary regulation component can perform dampened oscillations around a reference value corresponding to the height of a person resting on the seat,
    b) continuously detecting the value of the second quasi-stationary regulation component as a measurement value and forming a time average value of the second quasi-stationary regulation component, and
    c) adjusting the seating surface height to compensate for the actual weight of a person resting on the seat by adapting said second quasi-stationary regulation component so that said time average value of the second quasi-stationary regulation component approaches said reference value.

2. The method according to claim 1, wherein
    a) the reference value for the second, quasi-stationary regulation component of the absolute seating surface height has a fixed value, and
    b) the absolute seating surface height is adjusted by adaptation of the first, stationary basic component corresponding to the height of a person resting on the seat.

3. An apparatus for adjusting and maintaining the absolute seating surface height of a spring-action passenger seat, independent of interference factors, particularly in a motor vehicle, comprising:
    a) means for adjusting a first, stationary basic component of the absolute seating surface height value;
    b) means for adjusting a second, quasi-stationary regulation component of the absolute seating surface height value;
    c) a resiliency regulation mechanism controlling the means for adjusting the second, quasi-stationary regulation component to allow dampened oscillations of the seat around a reference value for the second, quasi-stationary regulation component; and
    d) a measurement device continuously detecting the value of the second, quasi-stationary regulation component and deriving a time average value of the second quasi-stationary regulation component from the measurement values and providing this time average value to the regulation mechanism, wherein said regulation mechanism controls said means for adjusting the second, quasi-stationary regulation component so that the time average value of the second quasi-stationary regulation component of the absolute seating surface height approaches the value of the reference value independent of the actual weight of a person resting on the seat.

4. The apparatus according to claim 3, wherein the regulation mechanism controls the means for adjusting the second, quasi-stationary regulation component based upon a fixed value of the reference value, and activates the means for adjusting the first, stationary basic component to adjust the absolute seating surface value based on the height of the person resting on the seat.

5. The apparatus according to claim 4, wherein the means to adjust the first, stationary basic component of the absolute seat height comprises a power-driven scissors lift mechanism without spring action.

6. The apparatus according to claim 4, wherein the regulation mechanism activates the means for adjusting the second, quasi-stationary regulation component in steps, in the form of activation steps.

7. The apparatus according to claim 4, wherein the regulation mechanism lowers or raises the seat by activating the means for adjusting the second, quasi-stationary regulation component, if the time average value of the second, quasi-stationary regulation component derived by the measurement device has exceeded a lower limit or upper limit of a tolerance range around the reference value of the quasi-stationary regulation component.

8. The apparatus according to claim 4, wherein the means for adjusting the second, quasi-stationary regulation component of the absolute seat height comprises a pneumatic folded bellows driven by compressed air.

9. The apparatus according to claim 3 wherein the regulation mechanism lowers or raises the seat by activating the means for adjusting the second, quasi-stationary regulation component, if the time average value of the second, quasi-stationary regulation component derived by the measurement device exceeds a lower limit or upper limit of a tolerance range around the reference value of the quasi-stationary regulation component.

10. The apparatus according to claim 9, wherein regulation mechanism does not activate the means for adjusting the second, quasi-stationary regulation component if the time average value of the quasi-stationary regulation component of the absolute seating surface height exceeds the lower limit or upper limit of the tolerance range around the reference value of the quasi-stationary regulation component but only for the duration of a first dead time.

11. The apparatus according to claim 3, wherein the regulation mechanism activates the means for adjusting the second, quasi-stationary regulation component in steps, in the form of activation steps to lift the seat to the absolute seating surface height.

12. The apparatus according to claim 11, wherein the regulation mechanism adjusts the period of the current activation step in that the related activation period is increased or decreased by a time component, if the lift achieved by the preceding activation step has not exceeded a minimum value or a maximum value.

13. The apparatus according to claim 12, wherein the activation period in each instance is increased or reduced by half of the original value.

14. The apparatus according to claim 13, wherein the regulation mechanism further comprises a first and a second memory for achieving the current values of the activation periods for raising and lowering the seat.

15. The apparatus according to claim 12 wherein the regulation mechanism further comprises a first and a second memory for achieving the current values of the activation periods for raising and lowering the seat.

16. The apparatus according to claim 11, wherein the regulation mechanism does not activate the means for adjusting the second, quasi-stationary regulation component if the value of the quasi-stationary regulation component of the absolute seating surface height exceeds the lower limit or the upper limit of the tolerance range around the reference value of the quasi-stationary regulation component but only for the duration of a first dead time.

17. The apparatus according to claim 16, wherein the regulation mechanism adjusts the period of the current activation step in that the related activation period is increased or decreased by a time component, if the lift achieved by the preceding activation step has not exceeded a minimum value or a maximum value.

18. The apparatus according to claim 16, further comprising means for blocking the regulation mechanism and the means for adjusting the second, quasi-stationary regulation component for the duration of a second dead time after an activation step has elapsed, wherein after the second dead time has elapsed, the regulation mechanism detects the change in the value of the quasi-stationary regulation component of the absolute seating surface height achieved by the activation step.

19. The apparatus according to claim 3, wherein the means to adjust the first, stationary basic component of the absolute seat height comprises a power-driven scissors lift mechanism without spring action.

20. The apparatus according to claim 3, wherein the means for adjusting the second, quasi-stationary regulation component comprises a pneumatic folded bellows driven by compressed air.

* * * * *